UNITED STATES PATENT OFFICE.

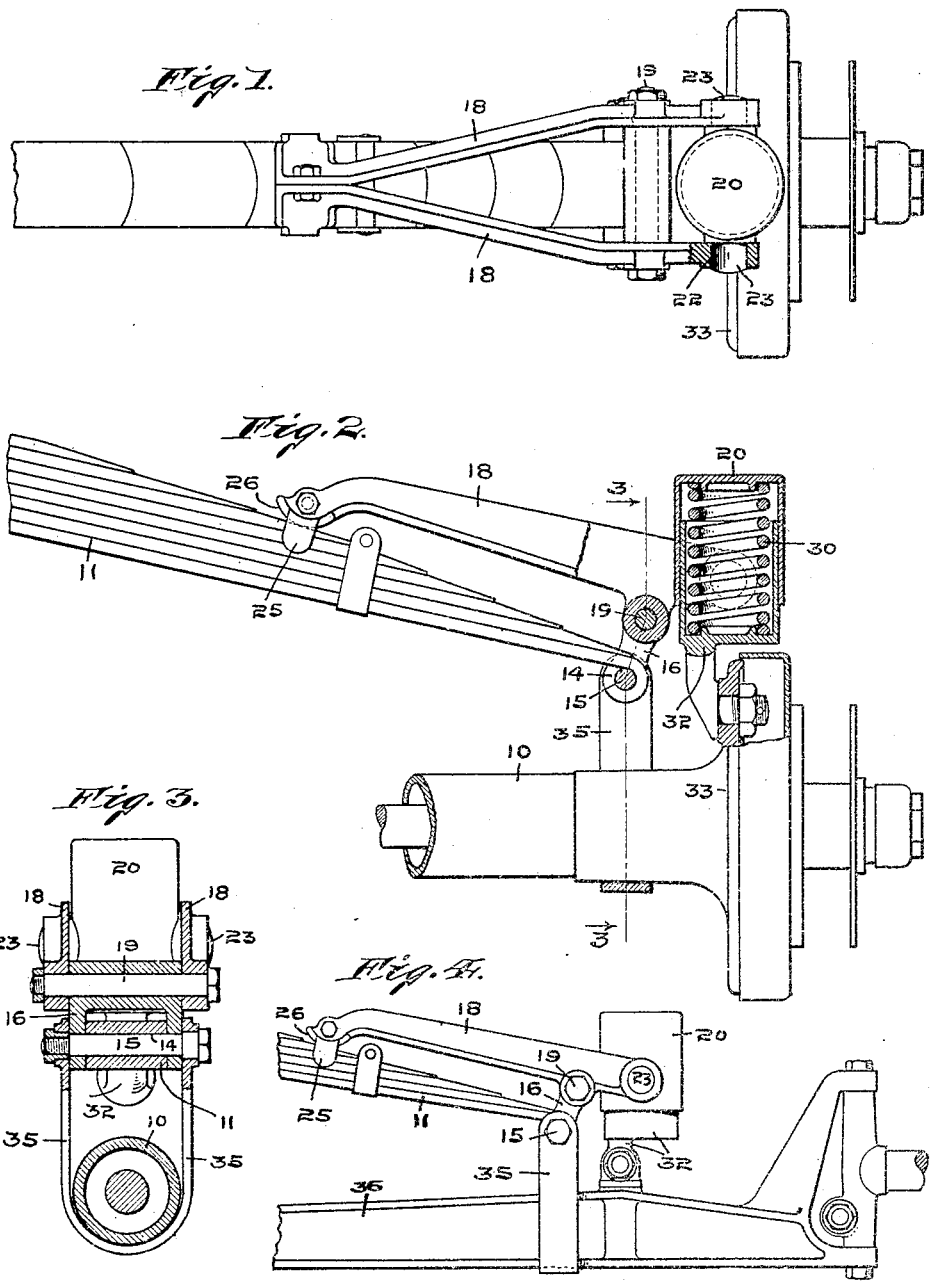

DALMAR T. BROWNLEE, OF INDIANAPOLIS, INDIANA.

SPRING SUSPENSION FOR VEHICLES.

1,364,702.   Specification of Letters Patent.   Patented Jan. 4, 1921.

Application filed October 28, 1920. Serial No. 420,280½.

*To all whom it may concern:*

Be it known that I, DALMAR T. BROWN-LEE, a citizen of the United States, residing at Indianapolis, in the county of Marion and State of Indiana, have invented a new and useful Spring Suspension for Vehicles, of which the following is a specification, reference being had to the accompanying drawings, and to the letters and figures of reference marked thereon.

This invention relates to improvements in spring suspensions for vehicles, and particularly to motor vehicles wherein auxiliary devices are employed in connection with the main springs for improving the riding qualities of such vehicles; and the objects of the invention are, first, to provide a device of the above character which may readily be applied to types of springs and axles now in common use; second, to provide a device which, coacting with the main springs, will more effectively absorb the various shocks and vibrations incident to the movement of the vehicle over rough surfaces than obtains in other devices employed for this purpose; and, third, to provide a simple, neat appearing and durable construction not easily affected by extreme rough character of road surfaces.

I accomplish the above objects of the invention and such others as may appear from a perusal of the specification and claims by means of the construction illustrated in the accompanying drawings, forming a part hereof, in which—

Figure 1 is a fragmentary detail top or plan view of one end of a vehicle main spring, showing my invention in operative position. Fig. 2 is a view partly in elevation and partly in section of the construction shown in Fig. 1. Fig. 3 is a vertical cross section on the line 3—3 in Fig. 2. Fig. 4 is a fragmentary detail view, on a reduced scale, showing my invention as applied to the front axle of a motor vehicle.

Referring to the drawings, 10 represents one end of a conventional style of a rear axle housing for motor vehicles, and 11 a main spring for supporting the body of the vehicle which is arranged above and stands parallel with said housing. Each end of main spring 11 is usually formed into an eye 14 and these eyes receive bolts 15 for pivotally attaching suitable shackles 16, the latter extending to and connecting the levers 18 by means of bolts 19. Levers 18 are bifurcated at their outer ends to straddle the helical spring casings 20, and pivotal connections between the levers and casings are effected by means of apertures 22 in the levers engaging the trunnions 23 formed on the opposite sides of said casings. The opposite ends of levers 18 extend some distance past the shackle connections of spring 11 and bear upon the surface of the latter, the free ends of levers 18 being held in operative position and against lateral displacement by means of the depending ears 25. Examining Fig. 2 of the drawings, it will be observed that the surfaces where the free ends of levers 18 contact main spring 11 are formed convex, as at 26, so as to reduce friction at these points.

As stated before, the outer ends of levers 18 are pivotally connected to and are carried by the helical spring casings 20, and these casings are yieldably supported by means of suitable helical springs 30. Springs 30 are supported upon fixed brackets 32 which are bolted fast to plates 33 secured to the flared ends of axle housing 10.

In order to confine the rebound of the parts within prescribed limits, I provide the loops 35 which are secured to the ends of the main springs 11, these loops passing around the housing 10, or around the front axle 36 in case the device is arranged on said axle.

The operation of my invention and the results attained are as follows:

When a vehicle, such as an automobile, is driven at a high speed over ordinary roadways the undulations in the surfaces of such roadways cause various up and down vibrations in the wheels and axles of the vehicles, these vibrations being transmitted, with such modification as the introduction of the usual leaf springs impose, to the body of the vehicle.

A downward movement of the body of the vehicle is followed by an upward movement or rebound caused by the reaction of the customary leaf springs, and the effect of such rebound is more discomforting to the passengers of the vehicle than the downward movements. Moreover, a severe movement of the body of the vehicle is frequently followed by a series of rapidly diminishing motions or vibrations that are quite disagreeable to the occupants of the vehicle. Also, when the wheels on one side of the vehicle meet irregularities in the surface of the roadway which are different from those in the path of the wheels on the opposite side of the vehicle, a swaying motion is set up in the body of the vehicle which interferes with the steering thereof, and this is especially true in that type of vehicles in which the steering connecting rods and the springs are arranged transversely and the springs suspended from swinging shackles.

In the present device a severe downward motion of the body of the vehicle is relieved by the flattening of the main springs 11 through their shackle suspension; the yieldable mounting of levers 18, and the compression of helical springs 30.

A slight downward motion and the small rapid vibrations are absorbed almost entirely by the auxiliary helical springs 30, which by reason of their light weight and small inertia are much better adapted to absorb rapid vibrations than the comparatively heavy leaf springs 11.

In an upward motion, or rebound, of the vehicle body, the main springs 11 will rise, carrying with them the levers 18 until the loops 35 contact the housing and axle, thus ending further upward travel of the ends of springs 11 where they engage shackles 16. As the central portions of springs 11 continue to rise the free ends of levers 18 are carried upward, thereby further compressing auxiliary helical springs 30 through the trunnion connections between the parts, so that an increased reacting pressure is delivered back to the central and rising portions of main springs 11 through levers 18 which is induced by the resiliency of helical springs 30, thus gradually checking the rebound.

It will be observed that the auxiliary helical springs 30 are constantly under compression. The normal compression of these springs is due to the weight of the vehicle body and load, and the compression of these springs is increased by either a downward or an upward movement of the main springs 11.

It will be further observed that the free ends of levers 18 reach well toward the central portions of the main springs 11, whereby the rebound of said springs is centrally checked as well as at the ends, which arrangement is more effective than that of other devices which attempt to check the rebound entirely at the ends of the springs 11. Furthermore, due to the weight of the vehicle body and load, the free ends of levers 18 exert sufficient force upon the surfaces of springs 11 to substantially check any transverse or swaying movements of the vehicle body, so that the steering efficiency of certain types of vehicles is materially increased.

It will also be observed, that in the present device the auxiliary helical springs 30 rest, or substantially so, upon the housings 10 and axles 36—merely close fitting rigid supports 32 intervening—which construction permits springs 30 to more completely absorb the rapid axle vibrations than in those devices in which the vibrations must first be transmitted through levers and various other parts whose combined weight and inertia nullify the sensitive action of the auxiliary springs. Moreover, in the present device the weight of all the parts except one—spring supports 32—are carried by the helical springs 30, and hence I do not add weight to the axles and housings *per se*, which is of great advantage, and is well understood by builders of motor vehicles who have found in practice that the riding qualities of a vehicle are determined largely by the ratio of "sprung" weight to that of "unsprung" weight.

While I have shown the present device in the drawings as applied to an inverted semielliptic spring, I do not desire to be understood that I confine myself to this style of spring, as the present device is readily applicable to be employed in connection with quarter-elliptic, cantaliver and similar springs.

I claim:

1. In a vehicle, a main spring, a support, an auxiliary spring carried by said support, a lever carried at one end by the auxiliary spring and the free end of the lever movably engaging the main spring intermediate its ends, the end of the main spring being connected to the lever intermediate the ends of the latter.

2. In a vehicle, a main spring, a support, an auxiliary spring carried by said support, a lever carried at one end by the auxiliary spring and the free end of the lever contacting the main spring intermediate its ends, means for connecting the end of the main spring with the lever intermediate the ends of the latter, and means for limiting the rebound movement of the end of the main spring.

3. In a vehicle, a main spring, a support, an auxiliary spring carried by said support, a lever pivotally carried at one end by the auxiliary spring and the free end of the lever contacting the main spring intermediate the ends of the latter, means for connecting the end of the main spring with the lever intermediate the ends of the latter, and means for guiding the pivoted end of the lever in a vertical plane.

4. In a vehicle, an axle, a main spring, a support, an auxiliary spring carried by said support, a lever suported at one end by said auxiliary spring and the other end of said lever resting on the main spring intermediate the ends of the latter, means for connecting the end of the main spring with the lever intermediate the ends of the latter, and means coacting with the axle for limiting the rebound movement of the end of the main spring.

5. In a vehicle, an axle, a main spring, a support, an auxiliary spring carried by said support, a lever supported at one end by said auxiliary spring and the other end of said lever resting on the main spring intermediate the ends of the latter, means for connecting the end of the main spring with the lever intermediate the ends of the latter, and a loop coacting with the axle for limiting the rebound movement of the end of the main spring.

In testimony whereof I affix my signature in presence of two witnesses.

DALMAR T. BROWNLEE.

Witnesses:
  O. S. WHITEMAN,
  E. T. SILVIUS.